United States Patent
Alghareeb

(10) Patent No.: US 11,558,995 B1
(45) Date of Patent: Jan. 24, 2023

(54) MULTIFUNCTIONAL AGRICULTURAL MACHINE

(71) Applicant: GIFTEDNESS AND CREATIVITY COMPANY, Safat (KW)

(72) Inventor: Sarah M. M. M. Alghareeb, Safat (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

(21) Appl. No.: 17/687,634

(22) Filed: Mar. 5, 2022

(51) Int. Cl.
| | |
|---|---|
| *A01C 7/18* | (2006.01) |
| *A01C 5/04* | (2006.01) |
| *A01G 25/09* | (2006.01) |
| *A01B 27/00* | (2006.01) |
| *A01B 43/00* | (2006.01) |
| *A01C 5/06* | (2006.01) |

(52) U.S. Cl.
CPC ............... *A01C 7/18* (2013.01); *A01B 27/00* (2013.01); *A01B 43/00* (2013.01); *A01C 5/04* (2013.01); *A01C 5/066* (2013.01); *A01G 25/09* (2013.01)

(58) Field of Classification Search
CPC .. A01C 7/18; A01C 5/04; A01C 5/066; A01C 25/09; A01C 21/005; A01C 17/008; A01B 27/00; A01B 43/00; A01G 25/09
See application file for complete search history.

(56) References Cited

U.S. PATENT DOCUMENTS

| | | | | |
|---|---|---|---|---|
| 6,138,590 | A * | 10/2000 | Colburn, Jr. | A01C 23/02 47/1.3 |
| 7,418,908 | B2 * | 9/2008 | Landphair | A01C 7/081 111/175 |
| 8,360,165 | B2 * | 1/2013 | Leith | E02F 3/764 172/821 |
| 8,849,523 | B1 * | 9/2014 | Chan | A01G 25/167 701/50 |

(Continued)

FOREIGN PATENT DOCUMENTS

| | | |
|---|---|---|
| CN | 212086940 U | 12/2020 |
| IN | 201911052742 A | 12/2019 |

OTHER PUBLICATIONS

"MARS: Robot system for planting and accurate documentation"; Sep. 8, 2017; printed from https://www.fendt.com/int/fendt-mars.

(Continued)

*Primary Examiner* — Jamie L McGowan
(74) *Attorney, Agent, or Firm* — Nath, Goldberg & Meyer; Richard C. Litman

(57) ABSTRACT

The multifunctional agricultural machine includes a vehicle body with a plurality of wheels rotatably mounted thereon. At least one sensor is mounted on a front end of the vehicle body for measuring at least one soil condition. At least one soil excavation unit is mounted on the vehicle body for digging a hole in the soil. A seed tank is in communication with the at least one soil excavation unit for delivering a selectable number of seeds thereto. The at least one soil excavation unit is configured to drop the selectable number (Continued)

of seeds into the hole in the soil. A water tank is in fluid communication with the at least one soil excavation unit for delivering a selectable volume of water thereto. The at least one soil excavation unit is further configured to dispense the selectable volume of water in the hole in the soil.

20 Claims, 8 Drawing Sheets

(56) References Cited

U.S. PATENT DOCUMENTS

| | | | | |
|---|---|---|---|---|
| 9,924,629 | B2* | 3/2018 | Batcheller | A01B 79/005 |
| 2009/0223688 | A1* | 9/2009 | Hendron | E02F 9/2225 |
| | | | | 172/821 |
| 2011/0083867 | A1* | 4/2011 | Leith | E02F 3/764 |
| | | | | 172/734 |
| 2013/0289832 | A1* | 10/2013 | Pirotais | G05D 1/021 |
| | | | | 701/50 |
| 2014/0379228 | A1* | 12/2014 | Batcheller | A01B 79/005 |
| | | | | 701/50 |
| 2015/0142250 | A1* | 5/2015 | Cavender-Bares | A01C 7/00 |
| | | | | 111/200 |
| 2015/0266382 | A1* | 9/2015 | Penmetsa | B60L 1/14 |
| | | | | 307/10.1 |
| 2015/0366124 | A1* | 12/2015 | Kremmer | A01B 63/1006 |
| | | | | 701/2 |
| 2017/0227969 | A1* | 8/2017 | Murray | A01C 21/00 |
| 2018/0035599 | A1* | 2/2018 | Lacrouts-Cazenave | |
| | | | | A01D 45/001 |
| 2020/0383262 | A1* | 12/2020 | Schoeny | A01C 14/00 |

OTHER PUBLICATIONS

"InCommand 1200: A Dang Good Planting Display"; Feb. 21, 2019; printed from https://www.agleader.com/blog/incommand-1200-a-dang-good-planting-display/.

"Design and Fabrication of Multipurpose Agricultural Machine," Mar. 5, 2021; printed from https://nevonprojects.com/design-and-fabrication-of-multipurpose-agricultural-machine/.

* cited by examiner

MULTIFUNCTIONAL AGRICULTURAL MACHINE

BACKGROUND

1. Field

The disclosure of the present patent application relates to agriculture, and particularly to a programmable autonomous machine for performing seed planting operations.

2. Description of the Related Art

The proper planting of seeds is a multi-step process. Prior to the planting itself, the soil must first be "flipped" to break up the top layer of soil, clods of dirt, etc. Then, the soil must be "combed" to remove rocks, debris, waste products, etc. The digging of the holes in the soil requires foreknowledge regarding the proper diameter and depth of the hole based on the type of seed, the soil properties and the general environmental conditions. Once the holes are dug and the seeds have been dispensed into the holes, the soil and seeds must be irrigated, and the holes must then be filled in. In addition to each of these steps, knowledge of the soil properties should also be obtained, since each type of seed has its own set of optimal growing parameters. The above process is both time and labor intensive, and further requires measurements of soil properties to be taken, which is typically beyond the capabilities of an individual farmer. Thus, a multifunctional agricultural machine solving the aforementioned problems is desired.

SUMMARY

The multifunctional agricultural machine is a programmable and autonomous machine for performing planting operations. The multifunctional agricultural machine includes a vehicle body having opposed front and rear ends, and a plurality of wheels rotatably mounted on the vehicle body. At least one sensor is mounted on the front end of the vehicle body for measuring at least one soil condition. Additionally, at least one front soil excavation unit is mounted on the front end of the vehicle body, and at least one bottom soil excavation unit is mounted on a bottom of the vehicle body. Each of the at least one front soil excavation unit and the at least one bottom soil excavation unit is adapted for digging a hole in soil at a selectable depth.

A horizontally-extending shaft may be mounted on the front end of the vehicle body, such that the at least one front soil excavation unit may be mounted on the horizontally-extending shaft. An elongated U-shaped frame having opposed first and second ends may further be provided, such that the opposed first and second ends are each pivotally secured to the horizontally-extending shaft. The at least one sensor may be mounted on the elongated U-shaped frame.

A seed tank is mounted within the vehicle body and is in communication with the at least one soil excavation unit for delivering a selectable number of seeds thereto. The at least one soil excavation unit is configured to drop the selectable number of seeds into the hole it dug in the soil. The seed tank may be divided into a plurality of compartments for holding a variety of different types of seeds.

A water tank is mounted within the vehicle body and is in fluid communication with the at least one soil excavation unit for delivering a selectable volume of water thereto. The at least one soil excavation unit is further configured to dispense the selectable volume of water in the hole in the soil. Additionally, a front nozzle may be mounted on the front end of the vehicle body. The front nozzle is in fluid communication with the water tank for selectively and controllably spraying water on the soil. Further, a rear nozzle may be mounted on the rear end of the vehicle body. The rear nozzle is in fluid communication with the water tank for selectively and controllably spraying the water on the soil.

At least one solar panel may be mounted on the vehicle body for providing power to the multifunctional agricultural machine. Additionally, a soil flipping tool, a soil combing tool, and a soil leveling tool may each be pivotally mounted on the rear end of the vehicle body.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
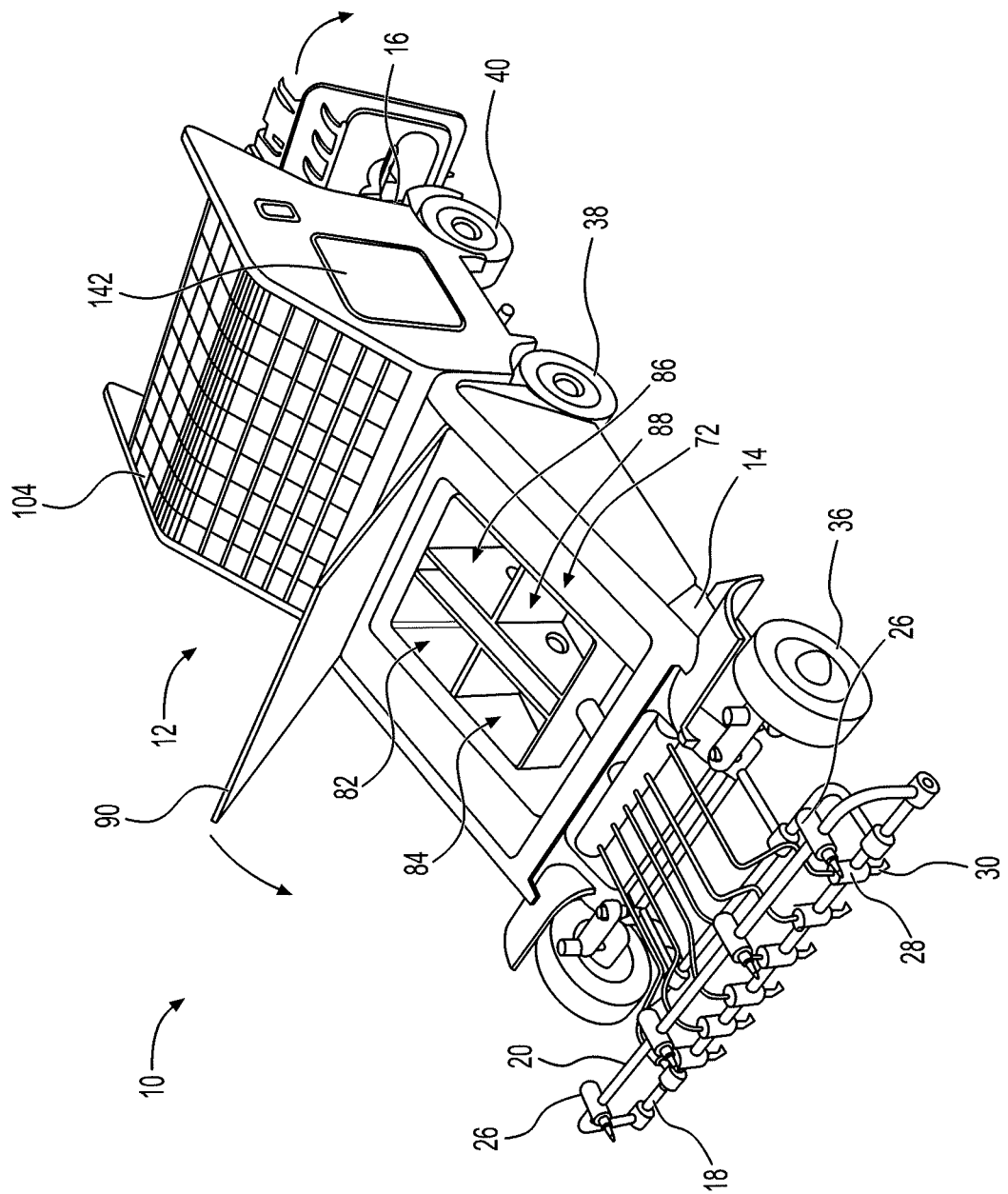
FIG. 1 is a front perspective view of a multifunctional agricultural machine.
Figure 2:
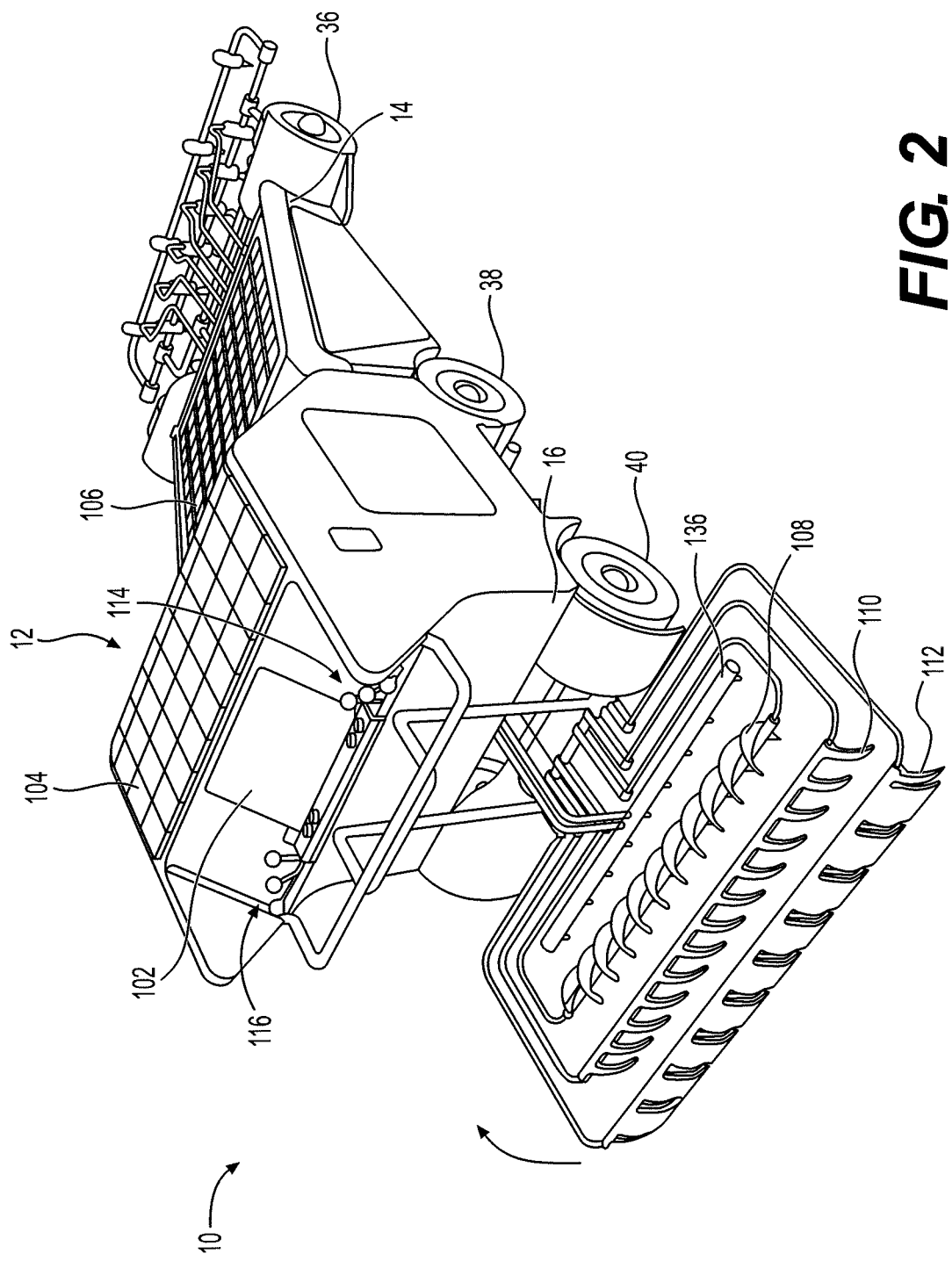
FIG. 2 is rear perspective view of the multifunctional agricultural machine.
Figure 3:
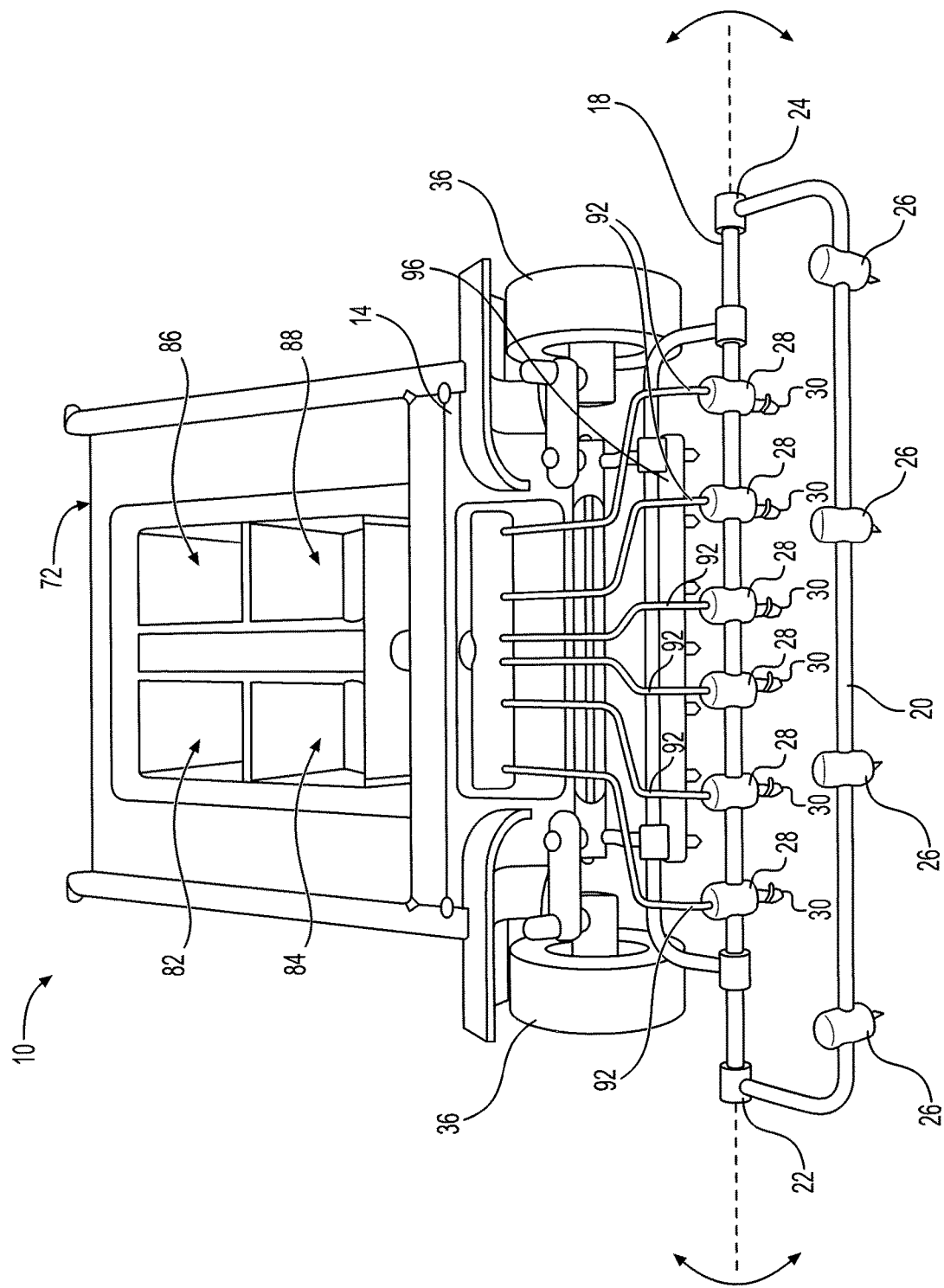
FIG. 3 is a front view of the multifunctional agricultural machine.

A multifunctional agricultural machine 10 is an autonomous vehicle equipped with multiple tools for performing a wide variety of agricultural functions. As shown in FIGS. 1 and 2, the multifunctional agricultural machine 10 includes a body 12 having a front end 14 and a rear end 16. As best seen in FIGS. 1 and 3, a shaft 18 is mounted on the front end 14 of body 12, extending substantially horizontally. An elongated U-shaped frame 20 has opposed ends 22, 24, which are pivotally mounted on shaft 18, allowing the elongated U-shaped frame 20 to selectively pivot up (as shown in FIG. 1) and down (as shown in FIG. 3). A rotational actuator, motor or the like may be provided for driving the rotation of elongated U-shaped frame 20 with respect to shaft 18. Sensors 26 are mounted on elongated U-shaped frame 20 for selectively contacting the soil to measure, for example, salinity, acidity and/or moisture content of the soil. It should be understood that sensors 26 may be any suitable type of sensors, either integrating, for example, salinity, acidity and/or moisture sensors into single sensor units, or with each of sensors 26 serving a separate function. It should be understood that the four sensors illustrated in FIGS. 1 and 3 are shown for exemplary purposes only, and that any suitable number of sensors may be mounted on elongated U-shaped frame 20.

Figure 8:
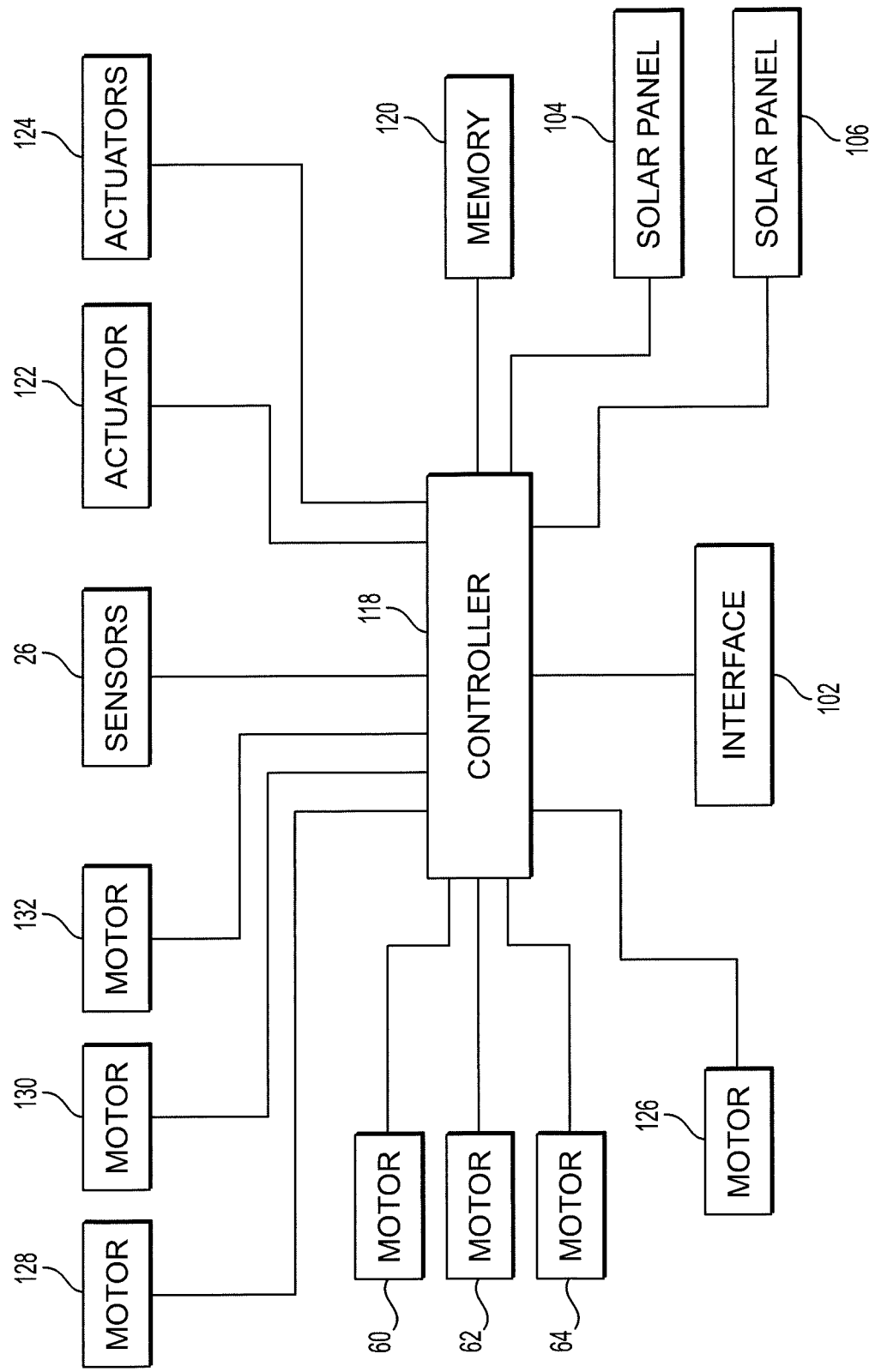
FIG. 8 is a block diagram showing system components of the multifunctional agricultural machine.

As shown in FIG. 8, sensors 26 are in communication with a controller 118. It should be understood that controller 118 may be any suitable type of controller, including but not limited to a processor, a microprocessor, a programmable logic controller, a personal computer, control circuitry or the like. Data from sensors 26 may be stored in memory 120, which may be any suitable type of computer-readable memory. An actuator 122 or the like for allowing elongated U-shaped frame 20 to pivot up and down may be in communication with controller 118 for automated and programmable control thereof.

Front soil excavation units 28, each with a digging blade 30, are mounted on shaft 18, as best seen in FIG. 3. Each front soil excavation unit 28 includes a linear actuator, rotary drive or the like, allowing the corresponding digging blade 30 to be lowered to a desired depth in the soil for soil excavation. It should be understood that the six front soil excavation units 28 illustrated in FIGS. 1 and 3 are shown for exemplary purposes only, and that any suitable number of front soil excavation units may be mounted on shaft 18. The actuator 124 or the like of each front soil excavation unit 28 may be in communication with controller 118 for automated and programmable control thereof.

Figure 4:
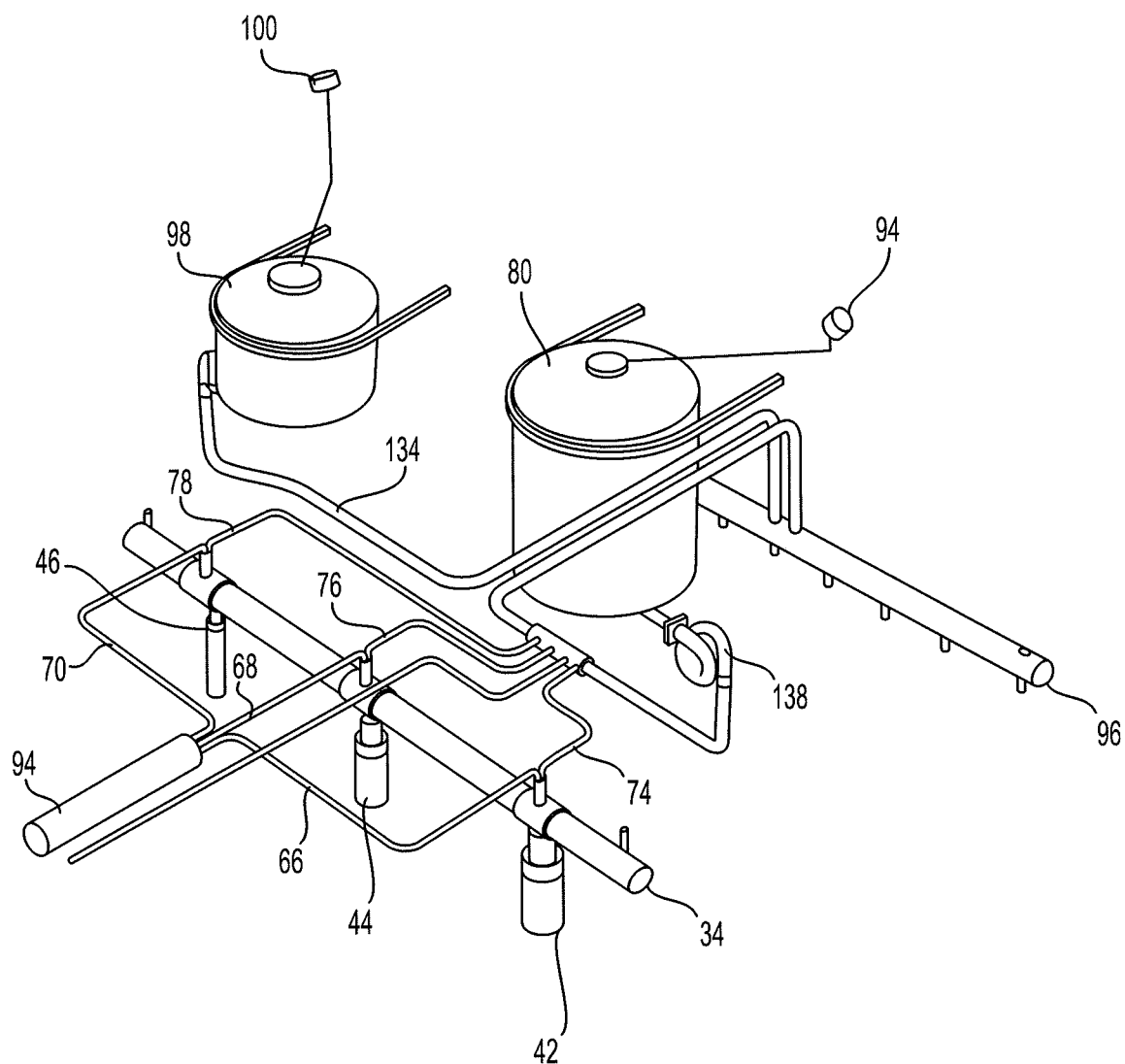
FIG. 4 is a perspective view of internal components of the multifunctional agricultural machine.
Figure 5:
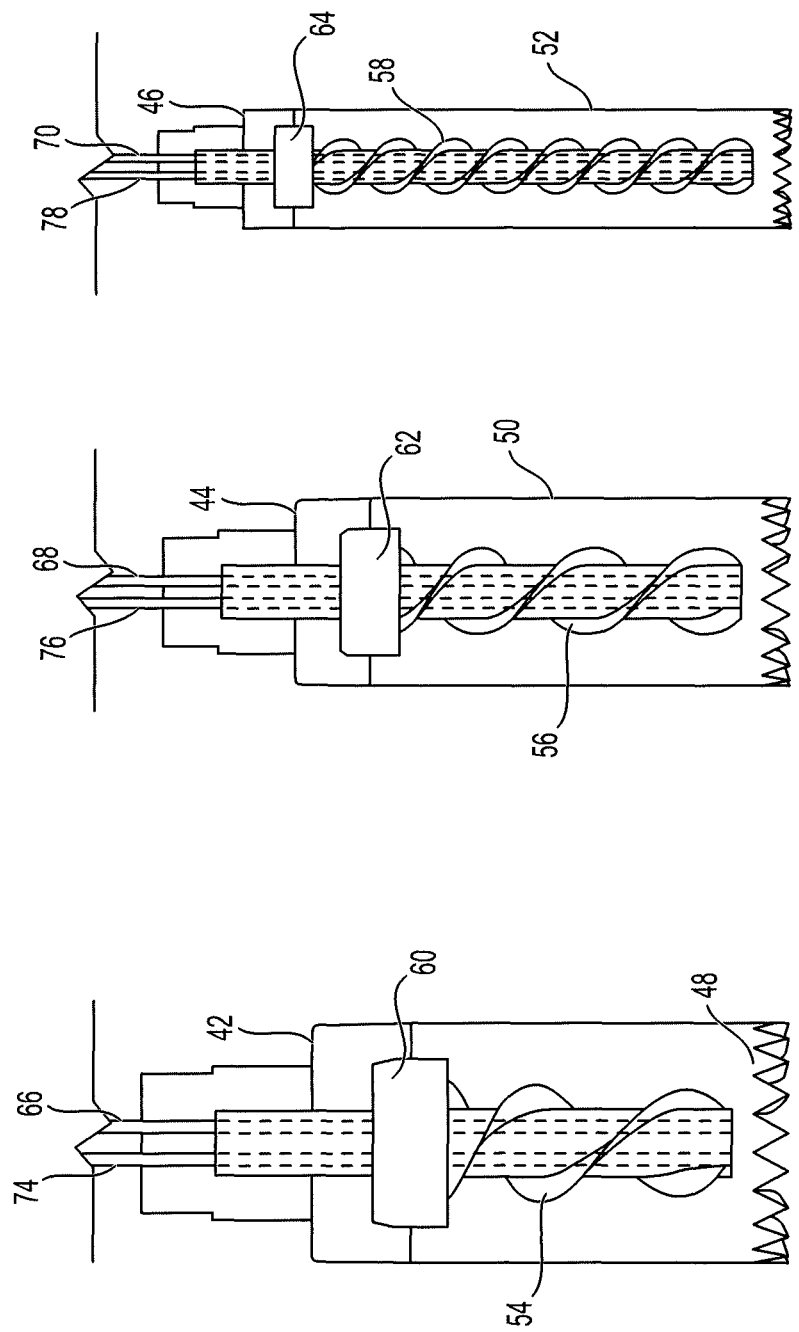
FIG. 5A, FIG. 5B and FIG. 5C each show a side view in section of a bottom excavation unit of the multifunctional agricultural machine, with each bottom excavation unit having a different size.

Additionally, as shown in FIG. 4, bottom soil excavation units 42, 44, 46 may be mounted beneath body 12 of multifunctional agricultural machine 10. The bottom soil excavation units 32 are mounted on a horizontally-extending shaft 34, which is mounted beneath body 12 between pairs of wheels 38 and 40. As shown in FIGS. 5A, 5B and 5C, each of bottom soil excavation units 42, 44, 46 may have a different size, although it should be understood that two or more of the bottom soil excavation units may have the same size, and that the number, sizes and relative dimensions of bottom soil excavation units 42, 44, 46 are shown for exemplary purposes only. In the non-limiting example of FIGS. 5A, 5B and 5C, each of bottom soil excavation units 42, 44, 46 includes a respective outer cylinder 48, 50, 52, and each of bottom soil excavation units 42, 44, 46 has substantially the same height, but with differing cylindrical radii. Rotary digging blades 54, 56, 58 are respectively mounted within outer cylinders 48, 50, 52, and are driven to rotate by motors, rotary drive units or the like 60, 62, 64, respectively. The motors, rotary drive units or the like 60, 62, 64 both drive rotation of digging blades 54, 56, 58 and lower the digging blades 54, 56, 58 into the soil at a desired depth. It should be understood that front soil excavation units 28 may work in an identical manner. The motors 60, 62, 64 or the like may be in communication with controller 118 for automated and programmable control thereof.

As a non-limiting example, each outer cylinder 48, 50, 52 may have a height of approximately 30 cm, and respective diameters of 9.5 cm, 7.0 cm, and 5.5 cm, respectively. As shown in FIGS. 5A, 5B and 5C, bottom soil excavation units 42, 44, 46 each include a seed tube 66, 68, 70, respectively, which connects the corresponding bottom soil excavation unit to a seed tank 72. The seed tank 72, as will be discussed in greater detail below, is best seen in FIG. 1. Bottom soil excavation units 42, 44, 46 also each include a water tube 74, 76, 78, respectively, which connects the corresponding bottom soil excavation unit to a water tank 80, as shown in FIG. 4. After digging with one or more of the bottom soil excavation units 42, 44, 46, one or more holes of desired depth(s) are formed in the soil. Seeds are delivered to the appropriate ones of bottom soil excavation units 42, 44, 46 from seed tank 72, and a desired number of seeds are dropped into the hole(s). Water is then delivered from water tank 80.

As shown in FIGS. 1 and 3, the seed tank 72 may be divided into a plurality of different compartments, each being adapted for holding a different type of seed. It should be understood that the four compartments 82, 84, 86, 88 are shown for exemplary purposes only, and that the seed tank 72 may be divided into any suitable number of compartments. In FIG. 3, cover 90 of seed tank 72 has been removed for purposes of illustration. As shown in FIG. 3, each of the front soil excavation units 28 is connected to the seed tank 72 through a seed tube 92. Returning to FIG. 4, a central seed tube 94 connects the seed tank 72 to seed tubes 66, 68, 70 of bottom soil excavation units 42, 44, 46, respectively.

As shown in FIG. 4, the water tank 80 is filled by the user through a fill tube 94. In addition to being in communication with bottom soil excavation units 42, 44, 46 through water tubes 74, 76, 78, respectively, the water tank 80 is also in communication with a front nozzle 96, which is best seen in FIGS. 3 and 4. It should be understood that the volume of water tank 80 may be varied, dependent upon the nature of the intended irrigation. As a non-limiting example, water tank 80 may be adapted for containing between 30 and 40 liters of water. Additionally, as further seen in FIG. 4, a treatment tank 98 (filled via filling tube 100) may also be provided for containing a treatment substance, which may be selected based upon the soil results of sensors 26.

As shown in FIG. 2, an interface 102, such as a touchscreen or the like, is mounted on body 12, allowing the user to program the operations of the multifunctional agricultural machine 10. Interface 102 is in communication with controller 118. In operation, the user may use interface 102 to determine the present levels of water in water tank 80 and the amount and/or types of seeds in each compartment of seed tank 72. The user may fill each tank as necessary for the planned agricultural tasks. For example, through interface 102, the user may input the desired land area to be planted with a desired seed type. Since seed tank 72 holds different types of seeds, different areas can be associated with different types of seeds. In addition to programming a general area to be planted, the user may also program specific locations within an area, or specific shapes of land, to be planted with the desired seed type. For example, a feature particular to planting flowers of different types and/or colors in a given area may be selected from interface 102. The user may select a desired shape in which the flowers should be arranged in the desired area, e.g., square, longitudinal, or heart-shaped. Then, the user may specify dimensions of the area in which each type of flower or flower color should be planted. As the seed tank can accommodate different types of seeds, there is no need to fill the tank with new seeds when a different seed type is needed to achieve a particular flower pattern. Interface 102 further displays the results of the soil tests to the user (e.g., moisture, salinity and acidity). Additional data, such as temperature and humidity, may also be displayed to the user, and may also be taken into consideration with regard to the planting programming. Further, the depth of planting (i.e., the selected depth of penetration by front soil excavation units 28 and bottom soil excavation units 42, 44, 46) may be input by the user. In addition to the usage of onboard interface 102, or in place of onboard interface 102, the programming may also take place remotely through wireless communication with the controller.

Figure 6:
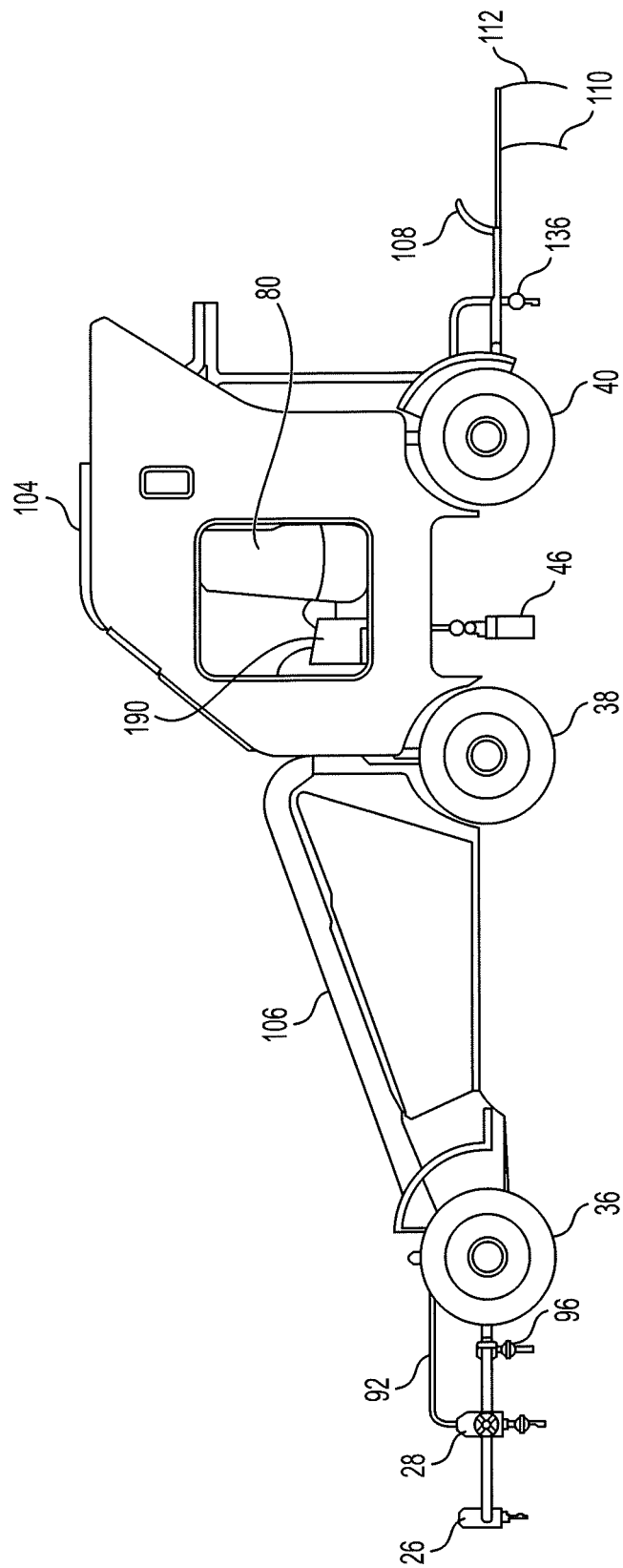
FIG. 6 is a side view of the multifunctional agricultural machine.

Power for the multifunctional agricultural machine 10 may at least be partially provided by solar panels 104, 106. As shown in FIGS. 1 and 2, solar panel 104 may be mounted on body 12, and additional solar panel 106 may be mounted on the cover 90 of seed tank 72. It should be understood that solar panels 104, 106 may include solar trackers, as are well known in the art, for maximizing solar exposure throughout the day. As shown in FIG. 6, a battery 140 may be provided for collecting energy produced by solar panels 104, 106. In FIG. 6, cover panel 142 has been removed to show the interior of body 12.

Figure 7:
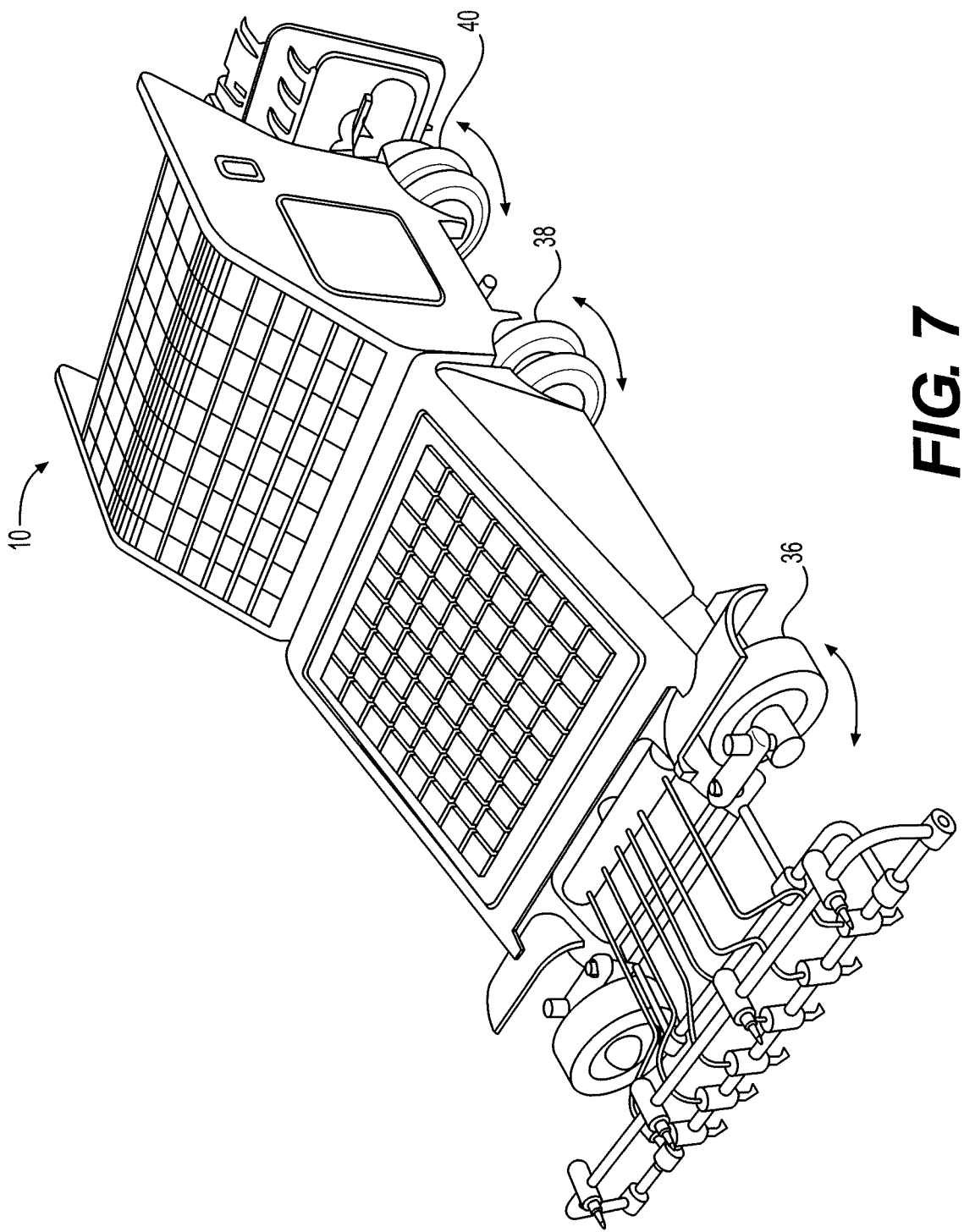
FIG. 7 is a perspective view of the multifunctional agricultural machine.

As shown in FIG. 7, the pairs of wheels 36, 38, 40 are both widely set and can turn at least 180° (for left-right steering), allowing for stable controllable travel of the multifunctional agricultural machine 10 over a wide variety of different types of terrain. Wheels 36, 38, 40 may be driven by an electric motor 126 or the like, which is in communication with controller 118 for providing autonomous and/or selective manual control over the motion and steering of the multifunctional agricultural machine 10.

Returning to FIGS. 1 and 2, a flipper 108, a comber 110 and a soil leveler 112 are each pivotally mounted on the rear end 16 of body 12. FIG. 1 shows each of the flipper 108, comber 110 and soil leveler 112 in an upright position, and FIG. 2 shows each of the flipper 108, comber 110 and soil leveler 112 rotated down into a position for contact with the soil. It should be understood that the up and down movement of the flipper 108, comber 110 and soil leveler 112 may be driven and controlled by motors, rotary actuators or the like. The flipper 108 is used to break up soil clods which may cause obstructions to the excavators. The comber 110 is used to comb the soil to extract rocks, waste, tree branches, etc. The soil leveler 112 is used after the planting of the seeds and the watering of the soil. The soil leveler fills in the holes and levels the top soil over the planted and irrigated seeds. The flipper 108, comber 110 and soil leveler 112 may be operated through programming via interface 102, or may be manually operated through the use of manual controls 114, as shown in FIG. 2. Similar manual controls may be provided for operation of the excavators. Additionally manual controls may be provided for starting and stopping the multifunctional agricultural machine 10, as well as operating the delivery of seeds and water. Flipper 108, comber 110 and soil leveler 112 may be raised and lowered into place by motors 128, 130, 132, respectively, or the like, which may be in communication with controller 118 for automated and programmable control thereof.

In use, the user enters the shape and dimensions of the land into interface 102. The user then enters the desired task via interface 102. For example, the user may select "soil inspection", which will make use of sensors 26 to inspect the soil. The user may also enter the distance and/or directions between the region to be inspected and an additional region to be inspected. The interface 102 may be configured to display a timer, indicating a projected time required to examine the soil. Under control of the programmed controller 118, the multifunctional agricultural machine 10 moves to the desired location and lowers the sensors 26 into the soil. Real-time results from sensors 26 may be displayed to the user on the interface. They may also be delivered wirelessly to the user to view remotely on a smartphone or the like.

Based on the measured moisture, acidity and salinity of the soil, the user may then select a desired seed to be planted in these conditions. Controller 118 may present options to the user, via interface 102, based on the measured moisture, acidity and salinity of the soil. The options presented by controller 118 may also indicate any additional treatments required for the seeds, as well as taking into account other environmental factors, such as temperature.

If the soil does not require treatment, then flipper 108, comber 110 and soil leveler 112 are used on the soil. The user may begin the process by selecting actuation of flipper 108 on the interface 102. Controller 118 will then lower the flipper 108 and begin flipping the soil to break up clods that may cause obstructions to the excavation. The flipping also facilitates the drilling process. Interface 102 may display the time elapsed for the flipping process. The user may then select actuation of comber 110 on the interface 102. Controller 118 will then lower the comber 110 and begin combing the soil to collect, for example, rocks, waste material, wood, plastic pieces, etc. Interface 102 may display the time elapsed for the combing process. The user may then select actuation of soil leveler 112 on the interface 102. Controller 118 will then lower the soil leveler 112 and begin preparing the soil for the excavation process.

If the soil first needs treatment, then treatment tank 98 is first filled with the appropriate treatment liquid. The treatment liquid is transferred to nozzle 96 through tube 134 (shown in FIG. 4), where it may then be sprayed on the soil. The user may program controller 118, through interface 102, to spray the treatment liquid only in desired locations. Additionally, the flipper 108 can be actuated at the same time, since the flipping process not only breaks up clods, but also aids in the distribution of materials in the soil during flipping. The interface 102 may also display a projected time for completion of this process. Upon completion of the spraying and flipping, the user may then initiate combing and soil leveling through interface 102.

Following the above processes, the user then selects the type of excavator to be used in the drilling process. The front soil excavation units 28 are suitable for shallow and medium depth pits, and the bottom soil excavation units 42, 44, 46 are suitable for deep pits. Both are operable with programmable and adjustable depths. If the user selects front soil excavation units 28, the user then enters (via interface 102) the appropriate depth of the seeds to be planted and the distance between the planted seeds. The user may also enter a seed dispersion pattern (e.g., random seed distribution, a certain number of seeds per hole, etc.), and enter which of compartments 82, 84, 86, 88 contain the appropriate seeds. The user may indicate all compartments if all of the land is to be planted with just one type of seed, or an individual compartment if different sections of land are to be planted with different seeds.

After selecting the desired seeds, interface 102 may display a page related to irrigation, and the user may select if irrigation is to occur with front nozzle 96, or if a rear nozzle 136 should be used. Water can be delivered to either nozzle by pump 138 (shown in FIG. 4). The digging, seed distribution and irrigation are then performed, as discussed above. The elapsed time for the process may be displayed on the interface 102. Similarly, the user may choose one of the bottom soil excavation units 42, 44, 46, which have different sizes for producing differently sized holes, as discussed above, and the process then proceeds in an identical manner.

It is to be understood that the multifunctional agricultural machine is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:
1. A multifunctional agricultural machine, comprising:
a vehicle body having opposed front and rear ends;
a plurality of wheels rotatably mounted on the vehicle body, wherein the plurality of wheels are pivotable about an axis of rotation such that the vehicle body can travel in a direction perpendicular to the front end or the rear end of the vehicle body;

at least one sensor mounted on the front end of the vehicle body for measuring at least one soil condition;

at least one soil excavation unit mounted on the vehicle body for digging a hole in soil at a selectable depth;

a seed tank mounted within the vehicle body, the seed tank being in communication with the at least one soil excavation unit for delivering a selectable number of seeds thereto, the at least one soil excavation unit being configured to drop the selectable number of seeds into the hole in the soil; and a water tank mounted within the vehicle body, the water tank being in fluid communication with the at least one soil excavation unit for delivering a selectable volume of water hereto, the at least soil excavation unit being further configured to dispense the selectable volume of water in the hole in the soil.

2. The multifunctional agricultural machine as recited in claim 1, wherein the at least one soil excavation unit comprises at least one front soil excavation unit mounted on the front end of the vehicle body and at least one bottom soil excavation unit mounted on a bottom of the vehicle body.

3. The multifunctional agricultural machine as recited in claim 2, further comprising a horizontally extending shaft mounted on the front end of the vehicle body, the at least one front soil excavation unit being mounted on the horizontally-extending shaft.

4. The multifunctional agricultural machine as recited in claim 3, further comprising an elongated U-shaped frame having opposed first and second ends, the opposed first and second ends each being pivotably secured to the horizontally-extending shaft, and the at least one sensor being mounted on the elongated U-shaped frame.

5. The multifunctional agricultural machine as recited in claim 1, wherein the seed tank is divided into a plurality of compartments for storing different seeds.

6. The multifunctional agricultural machine as recited in claim 5, wherein the plurality of compartments store different seed flower seeds, whereby seeds from each compartment are released in an amount necessary to achieve a pre-determined pattern.

7. The multifunctional agricultural machine as recited in claim 1, further comprising a front nozzle mounted on the front end of the vehicle body, the front nozzle being in fluid communication with the water tank for selectively and controllably spraying water on the soil.

8. The multifunctional agricultural machine as recited in claim 7, further comprising a treatment tank in fluid communication with front nozzle, the treatment tank configured for storing a soil treatment substance.

9. The multifunctional agricultural machine as recited in claim 7, further comprising a rear nozzle mounted on the rear end of the vehicle body, the rear nozzle being in fluid communication with the water tank for selectively and controllably spraying the water on the soil.

10. The multifunctional agricultural machine as recited in claim 1, further comprising at least one solar panel mounted on the vehicle body.

11. The multifunctional agricultural machine as recited in claim 1, further comprising a soil flipping tool pivotably mounted on the rear end of the vehicle body.

12. The multifunctional agricultural machine as recited in claim 11, further comprising a soil combing tool pivotably mounted on the rear end of the vehicle body.

13. The multifunctional agricultural machine as recited in claim 12, further comprising a soil leveling tool pivotably mounted on the rear end of the vehicle body.

14. A multifunctional agricultural machine, comprising:

a vehicle body having opposed front and rear ends;

a plurality of wheels rotatably mounted on the vehicle body, wherein the plurality of wheels are pivotable about an axis of rotation such that the vehicle body can travel in a direction perpendicular to the front end or the rear end of the vehicle body;

at least one sensor mounted on the front end of the vehicle body for measuring at least one soil condition;

at least one front soil excavation unit mounted on the front end of the vehicle body and at least one bottom soil excavation unit mounted on a bottom of the vehicle body, wherein each of the at least one front excavation unit and the at least one bottom soil excavation unit is adapted for digging a hole in soil at a selectable depth;

a seed tank mounted within the vehicle body, the seed tank being in communication with the at least one front end soil excavation unit and at least one bottom soil excavation unit for delivering a selectable number of seeds thereto, the at least front end soil excavation unit and at least one bottom soil excavation unit being configured to drop the selectable number of seeds into the hole in the soil; and a water tank mounted within the vehicle body, the water tank being in fluid communication with the front end soil excavation unit and at least one bottom soil excavation unit for delivering a selectable volume of water hereto, the front end soil excavation unit and at least one bottom soil excavation unit being further configured to dispense the selectable volume of water in the hole in the soil.

15. The multifunctional agricultural machine as recited in claim 14, further comprising a horizontally extending shaft mounted on the front end of the vehicle body, the at least one front soil excavation unit being mounted on the horizontally-extending shaft.

16. The multifunctional agricultural machine as recited in claim 15, further comprising an elongated U-shaped frame having opposed first and second ends, the opposed first and second ends each being pivotably secured to the horizontally-extending shaft, and the at least one sensor being mounted on the elongated U-shaped frame.

17. The multifunctional agricultural machine as recited in claim 14, wherein the seed tank is divided into a plurality of compartments for storing different seeds.

18. The multifunctional agricultural machine as recited in claim 14, further comprising a front nozzle mounted on the front end of the vehicle body, the front nozzle being in fluid communication with the water tank for selectively and controllably spraying water on the soil.

19. The multifunctional agricultural machine as recited in claim 18, further comprising a rear nozzle mounted on the rear end of the vehicle body, the rear nozzle being in fluid communication with the water tank for selectively and controllably spraying the water on the soil.

20. The multifunctional agricultural machine as recited in claim 14, further comprising a soil flipping tool pivotably mounted on the rear end of the vehicle body.

* * * * *